(12) United States Patent
Aratani

(10) Patent No.: US 6,266,042 B1
(45) Date of Patent: Jul. 24, 2001

(54) DISPLAY SYSTEM WITH RESOLUTION CONVERSION

(75) Inventor: Shuntaro Aratani, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/169,976

(22) Filed: Oct. 13, 1998

(30) Foreign Application Priority Data

Oct. 15, 1997 (JP) .................................................. 9-281906

(51) Int. Cl.$^7$ ....................................................... G09G 5/14
(52) U.S. Cl. ........................... 345/132; 345/428; 358/1.13
(58) Field of Search .................................. 345/132, 127, 345/428, 3, 114, 115; 382/232, 284; 358/298, 13, 401, 1.13, 537, 453

(56) References Cited

U.S. PATENT DOCUMENTS

| | | | |
|---|---|---|---|
| 5,612,715 | * 3/1997 | Karaki et al. | 345/132 |
| 5,686,960 | * 11/1997 | Sussman et al. | 348/218 |
| 5,689,343 | * 11/1997 | Loce et al. | 358/298 |
| 6,028,585 | * 2/2000 | Ishii et al. | 345/132 |
| 6,052,486 | * 4/2000 | Knowlton et al. | 382/232 |

* cited by examiner

Primary Examiner—Matthew Luu
Assistant Examiner—Thu-Thao Havan
(74) Attorney, Agent, or Firm—Fitzpatrick, Cella, Harper & Scinto

(57) ABSTRACT

A display system includes a display apparatus having a display panel capable of displaying an image having a first resolution, and a transmission apparatus for transmitting first image data representing the image having the first resolution and second image data representing an image having a second resolution lower than the first resolution to the display apparatus. The system has a first mode in which the transmission apparatus transmits the first image data to the display apparatus by dividing the first image data into a plurality of sub-areas so that a resolution in one sub-area is lower than a predetermined resolution, and the display device synthesizes image data for the sub-areas into a synthesized first image with the first resolution, and a second mode in which the transmission apparatus transmits the second image data, and the display apparatus converts the resolution of the second image data transmitted from the transmission apparatus into the first resolution and displays an image represented by the second image data with the first resolution.

50 Claims, 17 Drawing Sheets

DISPLAY SYSTEM WITH RESOLUTION CONVERSION

BACKGROUND OF THE INVENTION

1. Field of the Invention

The present invention relates to a display system, and more particularly, to supply of an image signal to a display device.

2. Description of the Related Art

Resolution of printers has improved year by year, and resolutions of 300–700 dpi (dots per inch) are now common. Some printers can even perform printing in a resolution of about 1,200 dpi. On the other hand, the current resolution in displays for computers remains on the order of 80–100 dpi, and is therefore much inferior to the resolution of printers. In order to save resources and reduce consumption of paper despite an increase of electronic information caused in part by the development of the Internet, displays having higher resolution are desired.

Ferroelectric liquid crystal displays (hereinafter abbreviated as "FLCDs") using ferroelectric liquid crystals (hereinafter abbreviated as "FLCs") can be used as high resolution displays. In contrast to other liquid crystal displays, FLCDs have a "memory capability". The memory capability of the FLCD causes a liquid crystal to hold a display state obtained by applying an electric field thereto. In a display using an FLC, thanks to such memory capability, the contrast is not degraded no matter how many scanning lines are used, so that a high-definition image can be displayed even with a simple matrix structure. Hence, such a display is attracting attention for implementing a next-generation of high-resolution displays.

It may be possible to adapt conventional display system hardware to a high-resolution display. However, since conventional display systems are not designed for high-resolution displays, the following problems arise.

1. New graphic chips and display drivers corresponding to the high resolution are required.

2. In the current mainstream window systems, such as Windows (a registered trade-mark of Microsoft Corp.), the sizes of standard display fonts and icons are designed assuming that they will be displayed at a resolution on the order of 80–100 dpi. Hence, these fonts and icons would be displayed with smaller sizes on a display having a higher resolution.

If a new dedicated high resolution window based system were to be constructed, such problems would not arise even if conventional display configuration were to be used. However, since such a system would generally be expensive and incompatible with conventional systems and software, users may not accept such a system.

SUMMARY OF THE INVENTION

It is an object of the present invention to solve the above-described problems.

It is another object of the present invention to allow to easily display a high-resolution image without newly constructing a system for high resolution.

According to one aspect of the present invention, a display system includes a display apparatus and a transmission apparatus. The display apparatus includes receiving means for receiving second resolution image data, resolution conversion means for converting the second resolution data to first resolution image data, a memory capable of storing the first resolution image data, and a display panel capable of displaying an image at the first resolution. The transmission apparatus transmits first image data representing the image having the first resolution and second image data representing an image having a second resolution lower than the first resolution to the display apparatus. The system has a first mode in which the transmission apparatus divides the first image data into a plurality of sub-areas so that a resolution in one sub-area is lower than a predetermined resolution, and transmits image data for each of the plurality of sub-areas to the display apparatus in sequence, and the display apparatus combines the image data transmitted from the transmission apparatus using the memory, and displays the image having the first resolution represented by the combined image data, and a second mode in which the transmission apparatus transmits the second image data, and the display apparatus converts the resolution of the second image data transmitted from the transmission apparatus into first resolution data using the resolution conversion means and displays the image having the first resolution using the display panel, based on the first resolution data.

According to another aspect of the present invention, an apparatus includes division means and transmission means. The division means divides data representing a first image having the first resolution into a plurality of lower resolution sub-areas. The transmission means transmits image data for each of the plurality of sub-areas generated by the division means to the display apparatus in sequence. The display apparatus regenerates the first image having the first resolution by combining the image data for each of the plurality of sub-areas transmitted from the transmission means.

According to still another aspect of the present invention, a display apparatus for displaying an image with a first resolution is provided. The display apparatus inputs second resolution image data for each of a plurality of sub-areas in sequence. The second resolution is lower than the first resolution. The display apparatus combines the image data for the plurality of sub-areas into combined image data with the first resolution, and displays an image represented by the combined image data with the first resolution.

According to yet another aspect of the present invention, a transmission apparatus for transmitting an image signal to a display apparatus capable of displaying an image having a first resolution is provided. The transmission apparatus divides first image data having the first resolution into a plurality of sub-areas so that a resolution in one sub-area is lower than a predetermined resolution, and transmits the first image data divided into the plurality of sub-areas to the display apparatus in sub-area units. The display apparatus regenerates the first image data having the first resolution by combining the first image data transmitted to the display apparatus after being divided into sub-areas.

The foregoing and other objects, advantages and features of the present invention will become more apparent from the following detailed description of the preferred embodiments taken in conjunction with the accompanying drawings.

DETAILED DESCRIPTION OF THE PREFERRED EMBODIMENTS

Preferred embodiments of the present invention will now be described in detail with reference to the drawings.

Figure 1:
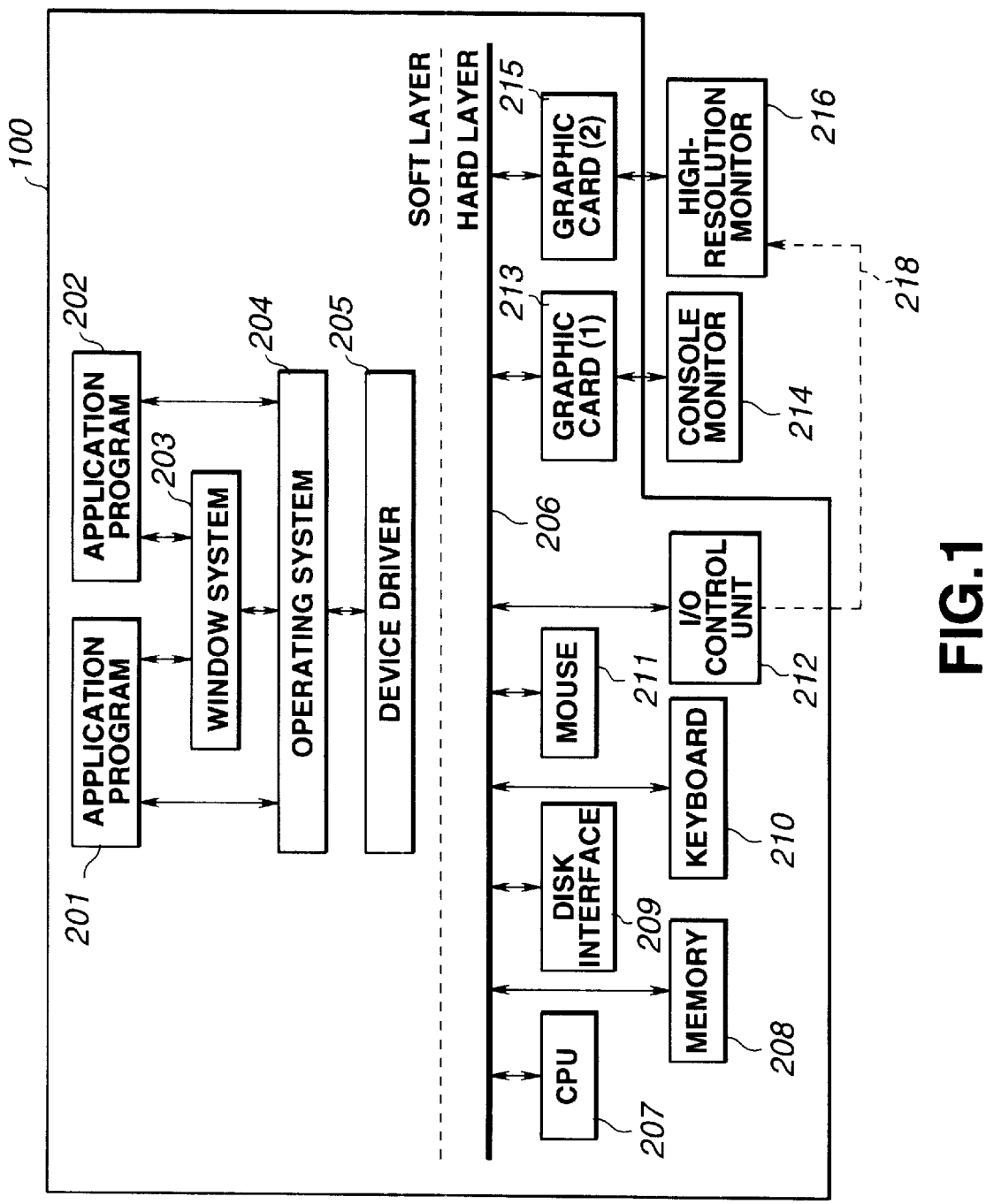
FIG. 1 is a block diagram illustrating the configuration of a display system according to a first embodiment of the present invention.

FIG. 1 is a block diagram illustrating the configuration of the entirety of a display system according to a first embodiment of the present invention. The system shown in FIG. 1 includes a host computer 100, and two monitors 214 and 216.

In the host computer 100, a CPU (central processing unit) 207 controls the entire computer. A memory 208 is used for program storage and as a working area when executing a program. A disk interface 209 controls a hard-disk drive and a floppy-disk drive, serving as external storage devices. A keyboard 210 is used for inputting character information and control information. A mouse 211 serves as a pointing device. An input/output control unit 212 has an interface, such as RS232C, USB (Universal Serial Bus), IEEE 1394 or the like. Each of graphic cards 213 and 215 transfers information written in the memory 208 by the CPU 207 to a display monitor. The units within the computer 100 are connected to one another by a bus system 206 comprising a data bus, a control bus and an address bus.

The CPU 207 runs application programs 201 and 202 for executing specific processing desired by the user, a window system 203 for controlling display of information on a dislay device serving as a user interface, an operating system 204 for executing the application programs 201 and 202, controlling the window system 203, and controlling the entire host computer 100, and a device driver 205 for directly controlling each device in accordance with instructions from the operation system 204.

Figure 2:
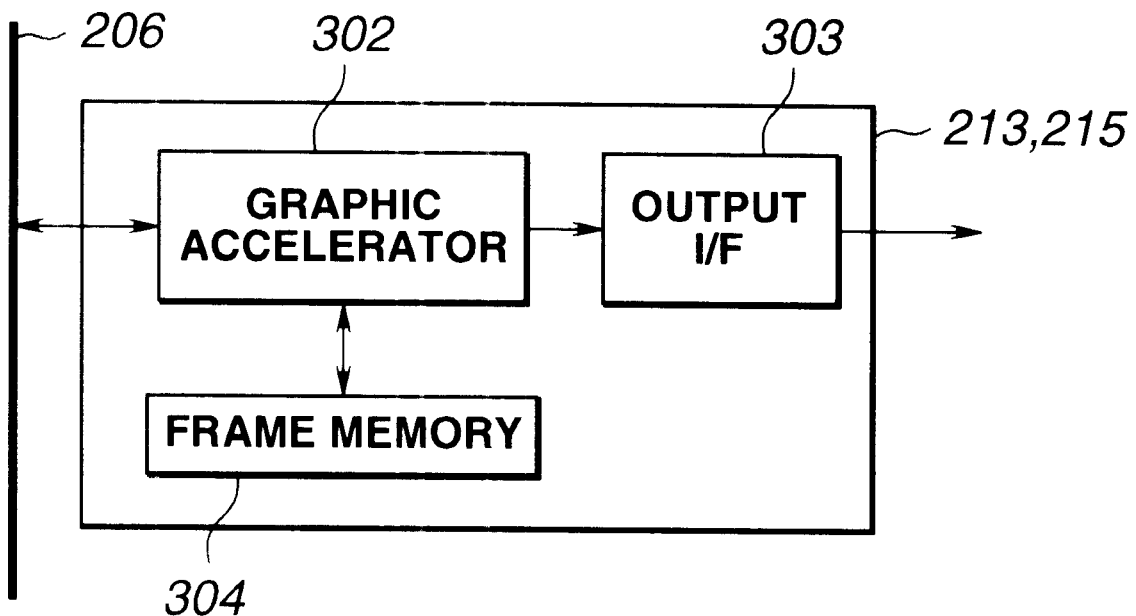
FIG. 2 is a block diagram illustrating the configuration of a graphic card shown in FIG. 1.

FIG. 2 is a block diagram illustrating the configuration of the graphic card 213. The graphic card 215 has the same configuration as the graphic card 213. Although a description will be provided of the graphic card 213, the graphic card 215 operates in the same manner as the graphic card 213.

Software in the host computer 100 provides an instruction to a graphic accelerator 302 in the graphic card 213 connected to an expanded bus in order to write an image signal in a frame memory 304. The graphic accelerator 302 reads the image signal written in the frame memory 304 for each line, and outputs the read image signal to an output I/F (interface) 303. The output I/F 303 converts the image signal output from the memory 304 into a video signal suitable for the monitor 214 by performing processing, such as parallel-serial conversion, addition of a synchronizing signal, and the like, and outputs the obtained video signal for each line. In the first embodiment, the graphic card 213 has a resolution of 1,024 pixels in the horizontal direction and 768 lines in the vertical direction, and outputs a video signal comprising 24 bits per pixel (8 bits for each of R, G and B signals).

Figure 3A:
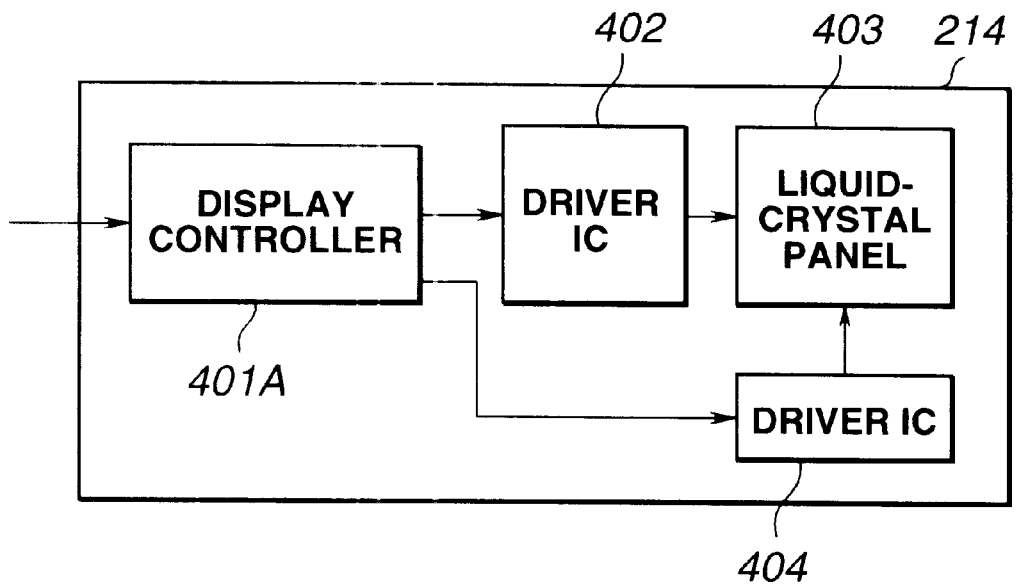
FIG. 3A is a diagram illustrating the configuration of a console monitor shown in FIG. 1.
Figure 3B:
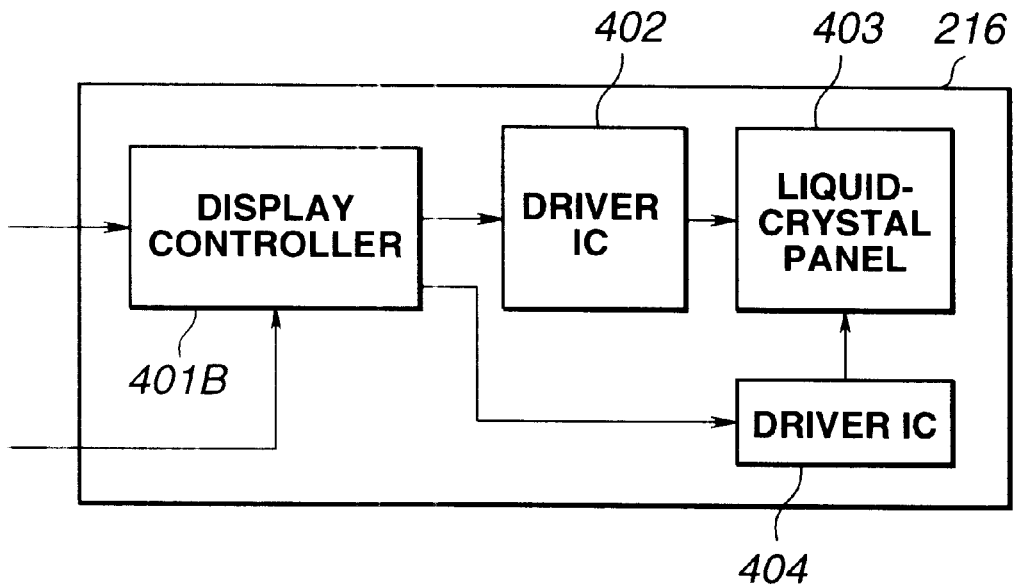
FIG. 3B is a diagram illustrating the configuration of the high resolution monitor shown in FIG. 1.

FIGS. 3A and 3B are block diagrams illustrating, respectively, the configuration of a console monitor 214 and a high-resolution monitor 216 (shown in FIG. 1).

In FIG. 3A, a display controller 401A receives the video signal from the graphic card 213 and generates an information signal and a scanning signal for driving an FLC panel 403. The FLC panel 403 is obtained in a conventional manner by disposing matrix electrodes and encapsulating an FLC between two glass plates subjected to orientation processing. Information electrodes and scanning electrodes of the FLC panel 403 are connected to driver ICs (integrated circuits) 402 and 404, respectively. The driver ICs 402 and 404 output respective driving pulses to the information electrodes and the scanning electrodes in accordance with the information signal and the scanning signal generated by the display controller 401A, respectively. These driving pulses determine which portions in the FLC panel 403 will be light and dark (black and white) to display an image.

The operation of he high resolution monitor 216 shown in FIG. 3B is similar, except the display controller 401B also receive storage position information, as explained below.

The specifications of the FLC panel 403 used in the first embodiment differ for the console monotor 214 and the high-resolution monitor 216. The FLC panel 403 in the console monitor 214 has a panel size of 15 inches, and a resolution of 768 lines in the vertical direction by 1,024 pixels in the horizontal direction. Each pixel includes subpixels having R, G and B color filters, and display of 8 colors can be performed by combining lighting of these sub-pixels.

The FLC panel 403 in the high-resolution monitor 216 has a panel size of 15 inches, and a resolution of 1,536 lines in the vertical direction and 2,048 pixels in the horizontal direction. Each pixel includes subpixels having R, G and B color filters, and display of 8 colors can be performed by combining lighting of these subpixels.

Figure 4:
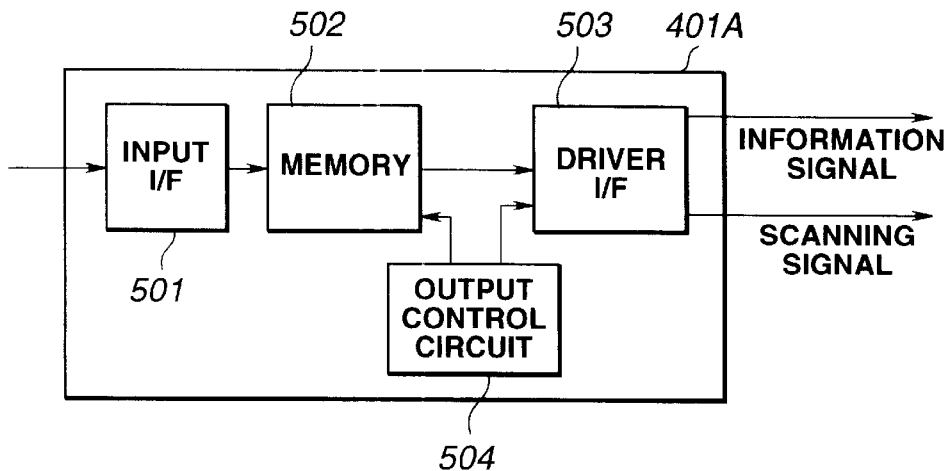
FIG. 4 is a block diagram illustrating the configuration of a display controller within the console monitor shown in FIG. 1.

FIG. 4 is a block diagram illustrating the configuration of the display controller 401A within the console monitor 214.

An input I/F 501 receives image data for each line from the video signal transmitted from the graphic card 213 in synchronization with synchronizing signals (a horizontal synchronizing signal, a vertical synchronizing signal, a pixel clock signal, and a display enable signal), and writes the received image data in a memory 502. An output control circuit 504 reads image data from the memory 502 in accordance with a scanning timing for the FLC panel 403, and outputs the read image data to a driver I/F 503. The driver I/F 503 generates a liquid-crystal driving signal as the one described above based on the image data from the memory 502, and outputs the generated signals to the driver ICs 402 and 404.

Figure 5:
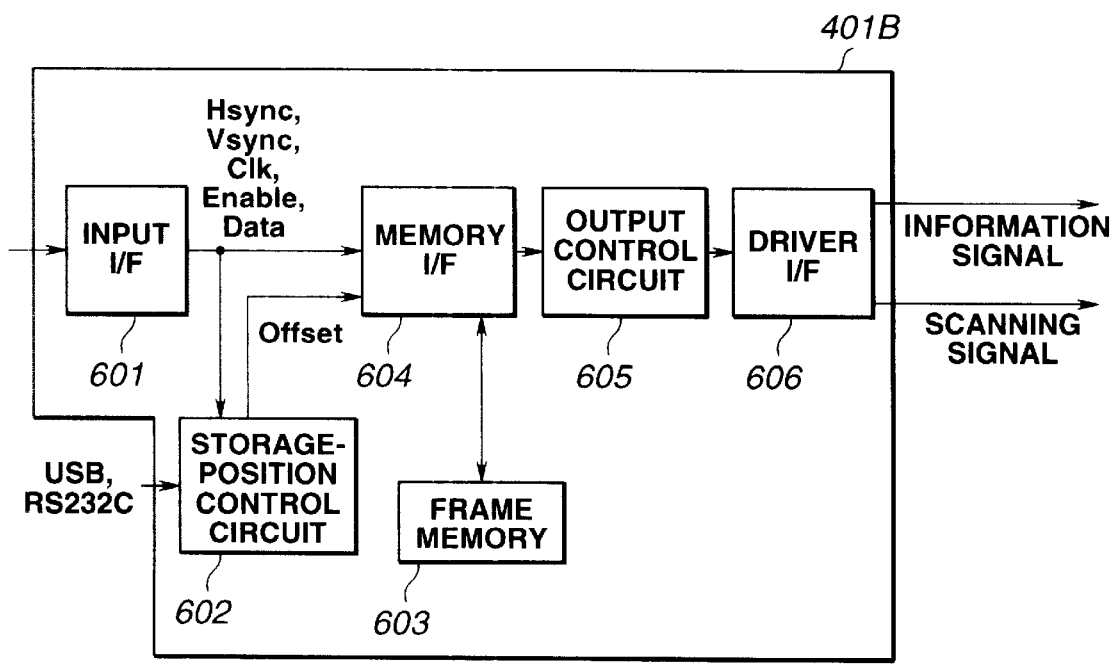
FIG. 5 is a block diagram illustrating a configuration of display controller within a high-resolution monitor shown in FIG. 1.

FIG. 5 is a diagram illustrating the configuration of the display controller 401B within the high-resolution monitor 216.

An input I/F 601 receives image data for each line output from the graphic card 215, and outputs the received image data to a memory I/F 604. The image data from the input I/F 601 is also output to a storage-position control circuit 602 together with each synchronizing signal. The storage-position control circuit 602 determines a storage position for the image data in a frame memory 603 from the image data and the synchronizing signal from the input I/F 601, and outputs a control signal indicating the determined position to the memory I/F 604. The detailed operation of the storage-position determination circuit 602 will be described later.

An output control circuit 605 reads image data for each line from the frame memory 603 in accordance with the scanning timing for the FLC panel 403, and outputs the read image data to a driver I/F 606. The driver I/F 606 generates the above-described information signal and scanning signal based on the image signal output from the frame memory 603, and outputs the generated signals to the driver ICs 402 and 404.

Next, a description will be provided of an operation of transferring image data from the host computer 100 to the monitors 214 and 216 in the first embodiment.

Figure 6:
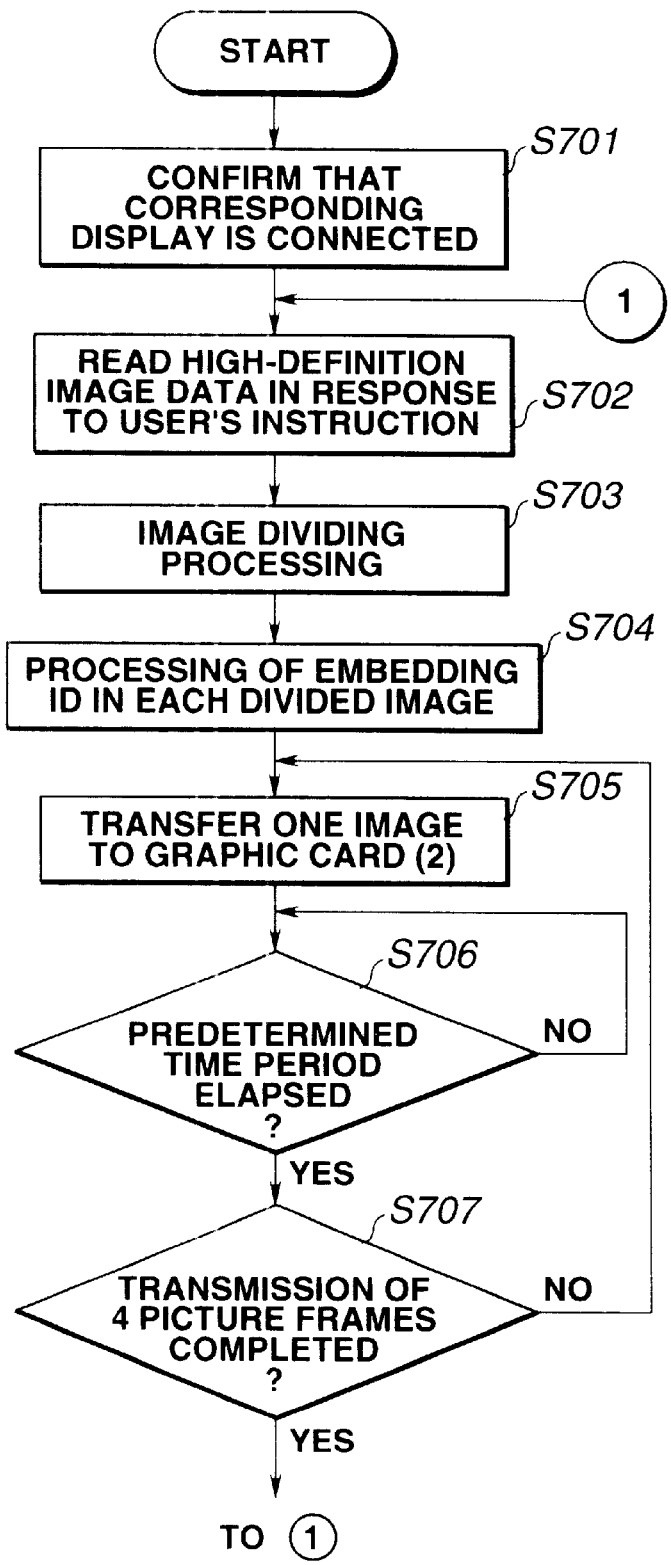
FIG. 6 is a flowchart illustrating processing of transmitting a high-resolution image signal.

FIG. 6 is a flowchart illustrating the operation of the CPU 207 performed in accordance with the application program shown in FIG. 1.

The application program may be started, for example, by clicking an icon on a window system displayed on the console monitor 214, which is the initial default display monitor. Display relating to the user's operation, and the like, are displayed on the consol monitor 214. In other words, all kinds of displays on the window system are performed using the graphic card 213. After starting the application program, the CPU 207 confirms that the high-resolution monitor 216 is connected to the host computer 100 via the operating system. The operating system of the first embodiment can obtain the monitor's specifications from the monitor by utilizing the DDC (Display Data Channel) provided by the VESA (Video Electronics Standard Association) when the operating system is started or when the monitor is connected. The application program can then confirm that the high-resolution monitor 216 is connected to the host computer 100, by obtaining data from the operating system (step S701).

Then, the application program reads high-definition (high-resolution) image data from the disk interface 209 and writes the read data in the memory 208 (both shown in FIG. 1) in accordance with the user's instruction (step S702). In the first embodiment, it is assumed that the resolution of the high-resolution image data read from the disk controller 209 is 2,048 pixels in the horizontal direction×1,536 lines in the vertical direction. This image data is divided into two equal portions in each of the vertical and horizontal directions, i.e., four equal sub-images, each comprising 1,024 pixels in the horizontal direction×768 lines in the horizontal direction, and is again written in the memory 208 (step S703).

Figure 7A:
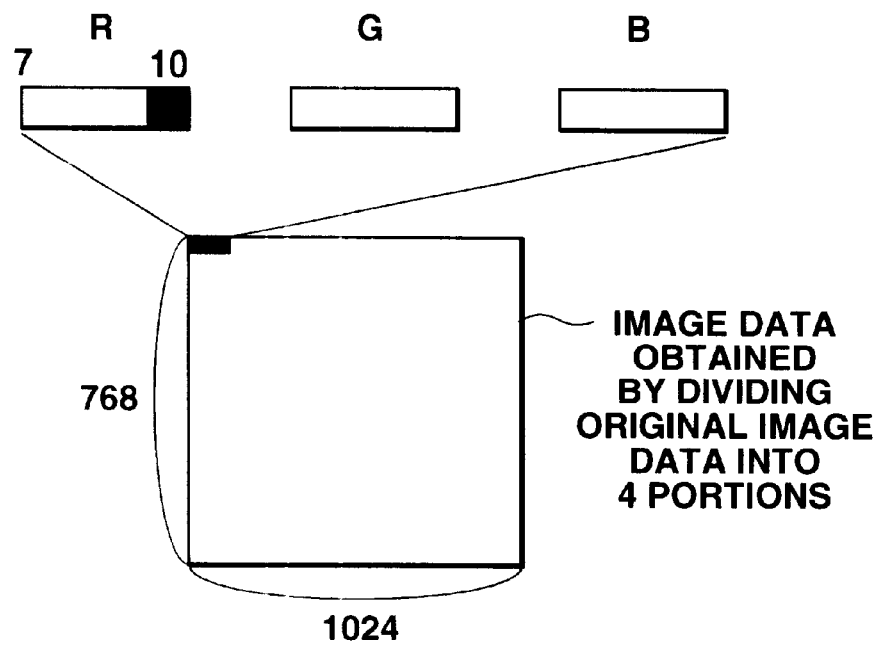
FIGS. 7(a) and 7(b) are diagrams illustrating the processing shown in FIG. 6.

Then, as shown in FIG. 7(a), the application program converts image data of the upper left portion of each sub-image (also refer to as a "divided images") into ID data indicating an image display position, as described below (step S704).

Figure 7B:
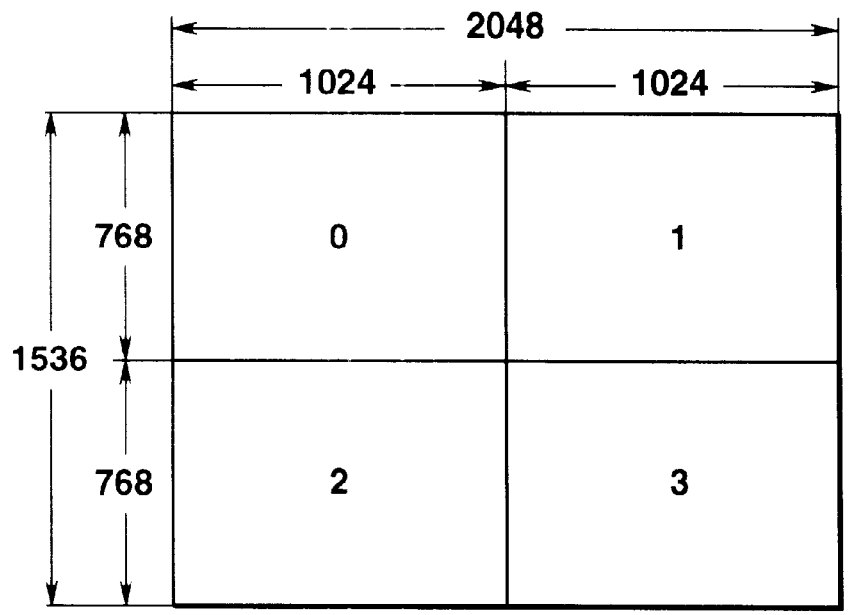

First, in the upper left image (represented by 0 in FIG. 7(b)), the lower 2 bits of 8-bit R (red) data of the upper left end pixel are converted into "00". Similarly, in the upper right image (represented by 1 in FIG. 7(b)), the lower 2 bits of 8-bit R (red) data of the upper left end pixel are converted into "01". Similarly, in the lower left image (represented by 2 in FIG. 7(b)) and the lower right image (represented by 3 in FIG. 7(b)), the lower 2 bits of 8-bit R (red) data of the upper left end pixel are converted into "10" and "11", respectively. Thus, each of these lower-2-bit values indicates the position of the corresponding sub-image.

Even if the data of lower 2 bits of each of R, G and B 8-bit image data is converted into ID data indicating an image display position in the above-described manner, the influence on the displayed image is small. Particularly in the first embodiment, since only the upper-left-end pixel of each sub-image data is changed, it can be considered negligible.

Upon completion of such conversion into ID data, each divided image data is read from the memory 20 and is output to the graphic card 215 (step S705 in FIG. 6).

The graphic card 215 outputs data for each divided image to the high-resolution monitor 216 (both shown in FIG. 1). In the high-resolution monitor 216, the input I/F 601 within the display controller 401B receives the divided image data, and outputs the received image data to the memory I/F 604 and the storage-position control circuit 602 (as shown in FIG. 5).

Turning now to FIG. 2, after each image data has been written in the memory 304 within the graphic card 215, the application program stops transfer of image data to the graphic card 215 at least until the output I/F 303 completes transmission of data for one divided image from the memory 304 to the monitor 216. For example, the application program may wait for a 2-frame time period (step S706 in FIG. 6), and then return to transfer the next divided image data (step S707).

Figure 8:
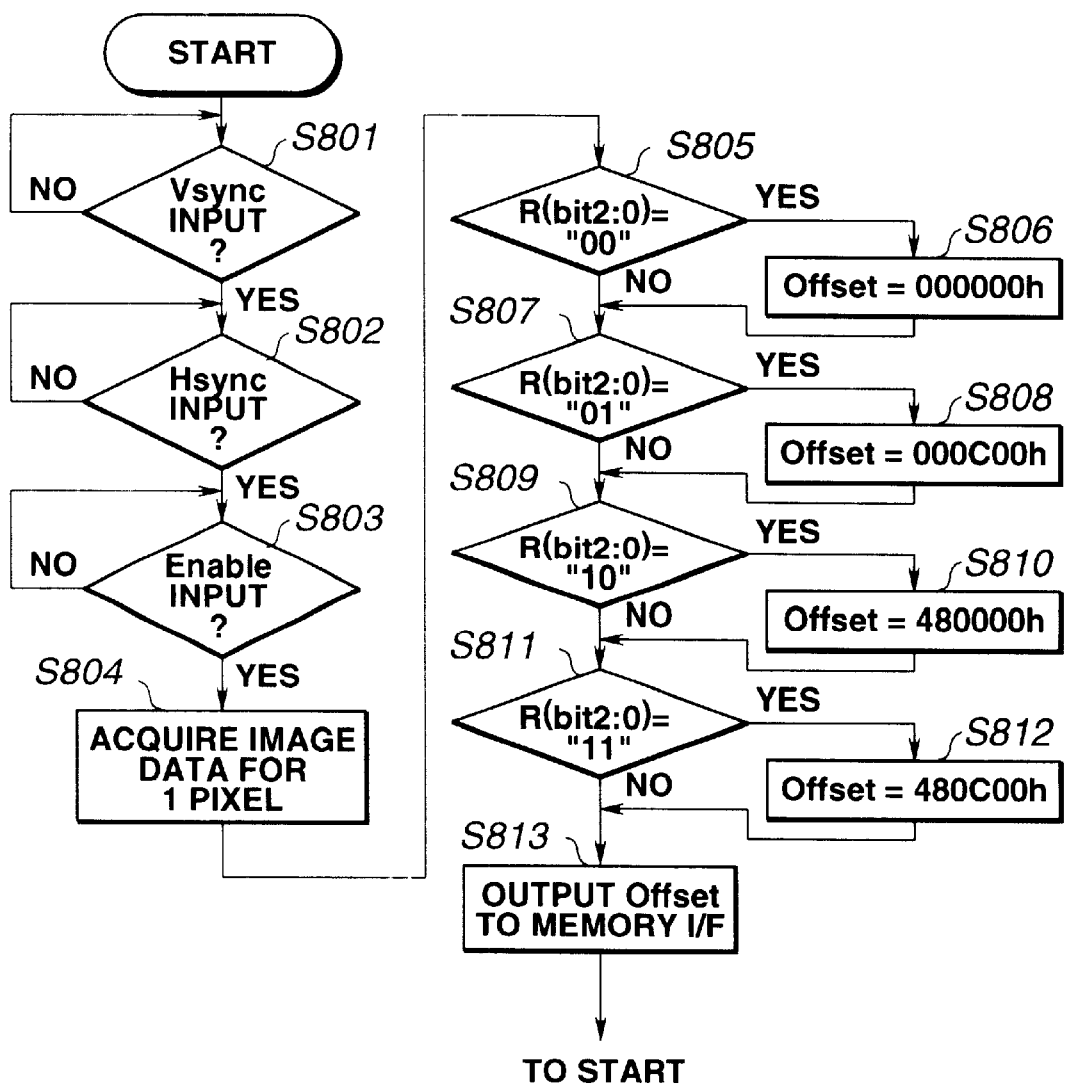
FIG. 8 is a flowchart illustrating an operation of a storage-position control circuit shown in FIG. 5.
Figure 9:
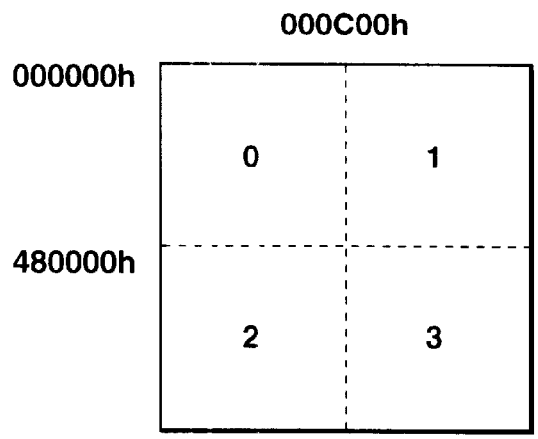
FIG. 9 is a diagram illustrating the operation shown in FIG. 8.

Next, a description will be provided of the operation of the storage-position control circuit 602 during transfer of divided image data performed in the above-described manner, with reference to the flowchart shown in FIG. 8 and the block diagram of FIG. 9.

First, after receiving each synchronizing signal and image data from the input I/F 601, the storage-position control circuit 602 confirms inputs of a vertical synchronizing signal, a horizontal synchronizing signal and a display enable signal (steps S801, S802 and S803), and receives image data for one pixel in synchronization with a pixel clock signal (step S804). If the lower two bits of 8-bit R data for the first one pixel are "00" (step S805), the offset value of the write address of the memory 603 is set to 000000h (step S806). If the lower two bits are "01" (step S807), the offset value of the write address of the memory 603 is set to 000C00h (step S808). Similarly, if the lower two bits are "10" and "11" (steps S809 and S811), the offset values of the memory address of the memory 603 are set to 480000h and 480C00h (steps S810 and S812), respectively. The determined offset value of the write address is output to the memory I/F 604 (step S813).

This offset value indicates the position of the upper left end on the picture frame of each divided image data in the frame memory 603 within the display controller 401B. When the offset values are 000000h, 000C00h, 480000h and 480C00h, image data are written in the upper left area (area 0 shown in FIG. 9), the upper right area (area 1 shown in FIG. 9) the lower left area (area 2 shown in FIG. 9) and the lower right area (area 3 shown in FIG. 9), respectively.

Figure 10:
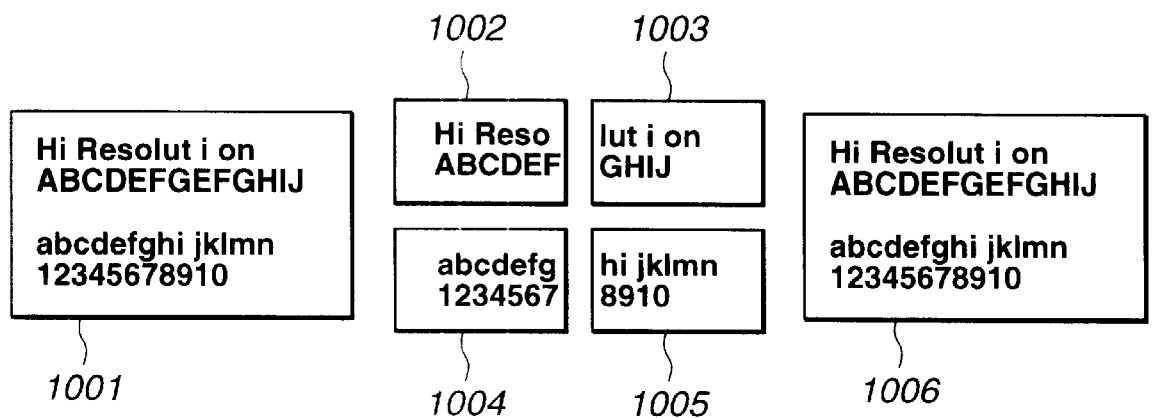
FIG. 10 is a diagram illustrating the processing of transmitting a high-resolution image signal.

Turning now to FIG. 10, which shows an image processed by the first embodiment, image data 1001 having a high resolution of 2,048×1,536 is divided by the application program and converted into four equal-size images 1002–1005, each having a resolution of 1,024×768. That is, high-resolution image data is first divided into image data having an ordinary resolution (capable of being processed by the graphic card 215) and then transmitted to the high-resolution monitor 216. The high-resolution monitor 216 synthesizes these divided images and displays the obtained image as an image 1006 having a resolution of 2,048×1,536.

Accordingly, in the system of the first embodiment, even if a graphic card and a graphic accelerator which support only a standard resolution level are used, and an ordinary device driver for controlling the graphic card is also used, it is still possible to output high-resolution image data from a host computer and display it on a high-resolution monitor.

In the first embodiment, since a high-resolution image of one picture frame is transmitted by being divided into four sub-areas, more time is required for transmitting high resolution image data for one picture frame than when transmitting image data having a standard resolution. Accordingly, the display system of the first embodiment is suitable for displaying still images.

According to the first embodiment, it is also possible to display a high-resolution image of document data on a high-resolution monitor even though the image was formed on the assumption that it would be seen with a standard resolution monitor.

Figure 11:
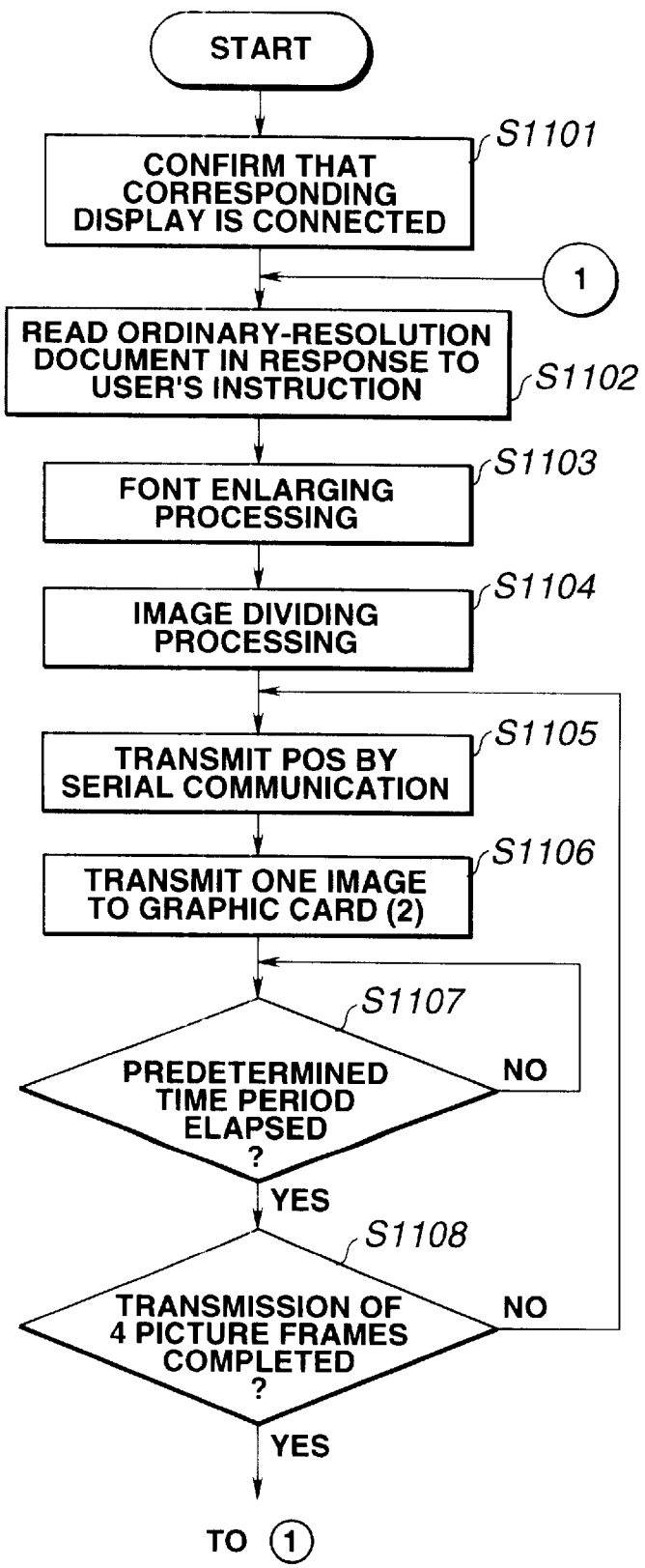
FIG. 11 is a flowchart illustrating another process of transmitting a high-resolution image signal.

FIG. 11 is a flowchart illustrating the operation of the application program in such a case and it is to be viewed together with FIG. 1. After starting the application program, it is confirmed that the high-resolution monitor is connected to the computer for the operating system (step S1101). Then, document data which has been formed on the assumption of being seen with a standard resolution is read from the disk interface 209 in accordance with an instruction from the user and is written in the memory 208 (step S1102). Suppose that an HTML (Hyper Text Markup Language) document formed on the assumption of being seen with a resolution of 1,024×768 is read. The application program performs magnifying processing for all font data of this document data (step S1103). For example, a 12-point Gothic font is converted into a 24-point Gothic font.

The document data subjected to magnifying processing for all font data is first written in the memory 208 as high resolution image data. Then, the high resolution image data is divided into two areas in the vertical and horizontal directions, i.e., into four areas, and is again stored in the memory 208 (step S1104).

In the application program described above in connection with FIGS. 6 and 7, a part of the pixel at the upper left end of each divided image data is converted into display-position information. However, the present invention is not limited to such an approach, and any other appropriate approach as for the first embodiment may also be adopted. For example, the display-position information may be transmitted to the monitor via a serial communication line, such as USB, RC232C, IEEE 1394 or the like (indicated by the dashed line 218 in FIG. 1).

Returning now to FIG. 11, with reference to FIGS. 1, 2 and 5, before transferring each divided image to the graphic card 215, the application program transfers image-display-position information POS to the display controller 401B within the high-resolution monitor 216 using the serial communication line 218 (step S1105).

That is, first when transmitting the upper left image data (area 0 in FIG. 7(b)), "0" is transferred by serial communication. When transferring the upper right image data (area 1 in FIG. 7(b)), "1" is transferred by serial communication. Similarly, when transferring the lower left and lower right image data (areas 2 and 3 in FIG. 7(b)), "2" and "3" are transferred, respectively, by serial communication. Then, the graphic card 215 outputs each divided image data to the high-resolution monitor 216. In the high-resolution monitor 216, the input I/F 601 within the display controller 401B receives the divided image data, and outputs the received image data to the memory I/F 604 and the storage-position control circuit 602.

After each image data has been written in the memory 304 within the graphic card 215, the application program stops transfer of image data to the graphic card 215 at least until the output I/F 303 completes transmission of one divided image data written in the memory 304 to the monitor 216. This transfer stoppage may be, for example, for a 2-frame time period (step S1107). Data transfer then continues for the next divided image data (step S1108).

Figure 12:
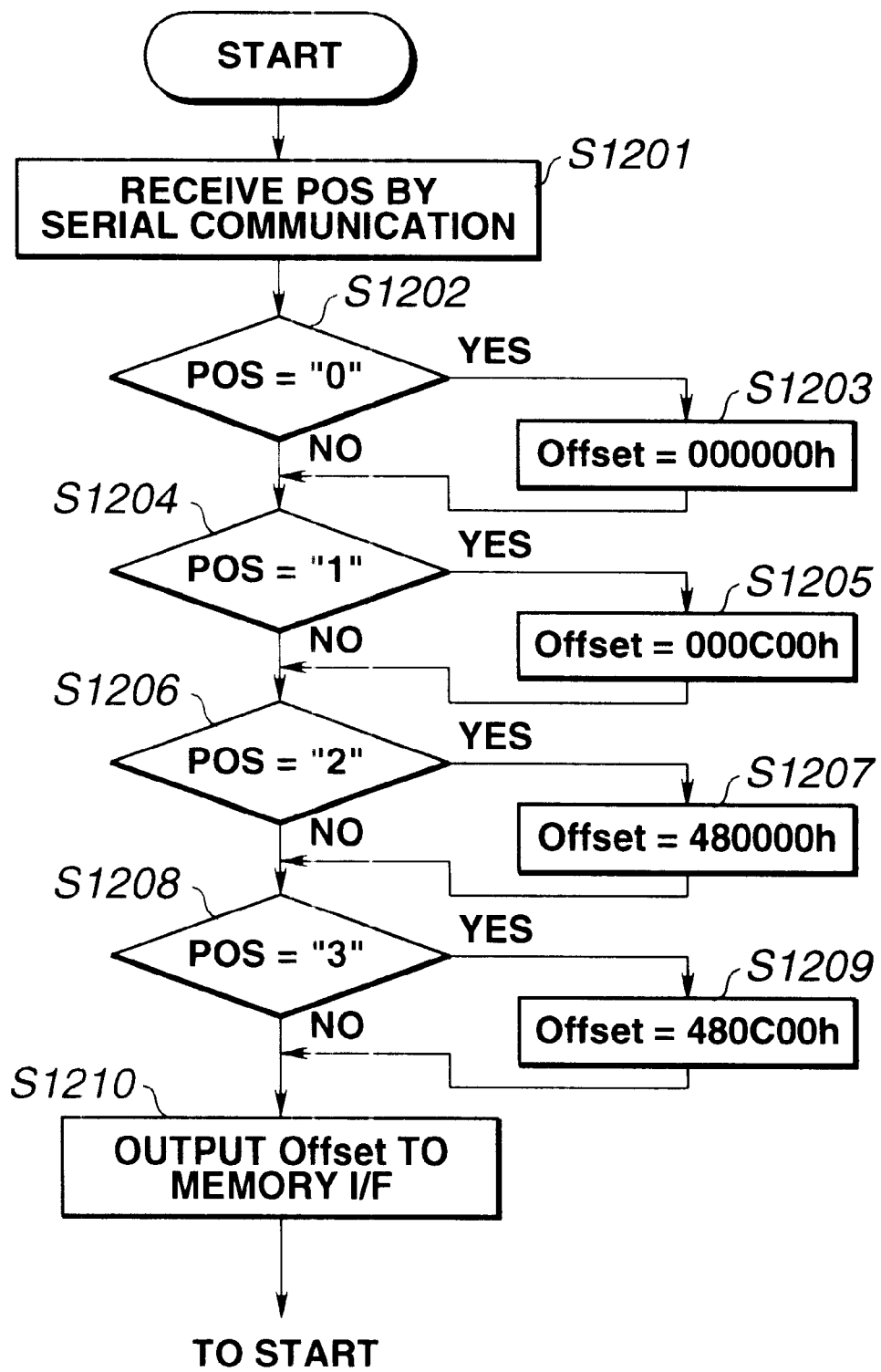
FIG. 12 is a flowchart illustrating another operation of the storage-position control circuit shown in FIG. 5.

FIG. 12 is a flowchart illustrating, together with FIGS. 1 and 5, the operation of the storage-position control circuit 602 of the display controller 401B when the high-resolution monitor 216 receives image data transferred as shown in FIG. 11 First, before receiving image data, the display-position information POS is input by serial communication from the computer (step S1201), and the offset value of the write address of the frame memory 603 is determined in accordance with the indicated display position.

If the POS is "0" (step S2102), the offset value is set to 000000h (step S1203). If the POS is "1" (step S1204), the offset value is set to 000C00h (step S1205). Similarly, if the offset values are "2" and "3" (steps S1206 and S1208), the offset values are set to 480000h and 480C00h (steps S1207 and S1209), respectively. After determining the offset value of the write address of the frame memory 603, the storage-position control circuit 602 outputs the determined offset value to the memory I/F 604 (step S1210).

As described above, in the first embodiment, after performing font magnifying processing for a document formed on the assumption that it will be displayed with standard resolution, one picture frame is divided into four equal portions (as in the above-described case of high-resolution image data) and is transferred to the high-resolution monitor together with display-position information. Data obtained by synthesizing transferred document data in accordance with the display-position information transferred by serial communication is thus displayed as a high-resolution document on the high-resolution monitor.

Hence, according to the first embodiment, documents originally intended for display on a standard resolution monitor can be displayed on a high-resolution monitor without reducing the size of displayed characters.

While the first embodiment uses the console monitor 214 to display standard-resolution image data, it is also possible to display both high-resolution image data and standard-resolution image data using only the high-resolution monitor 216.

Figure 13:
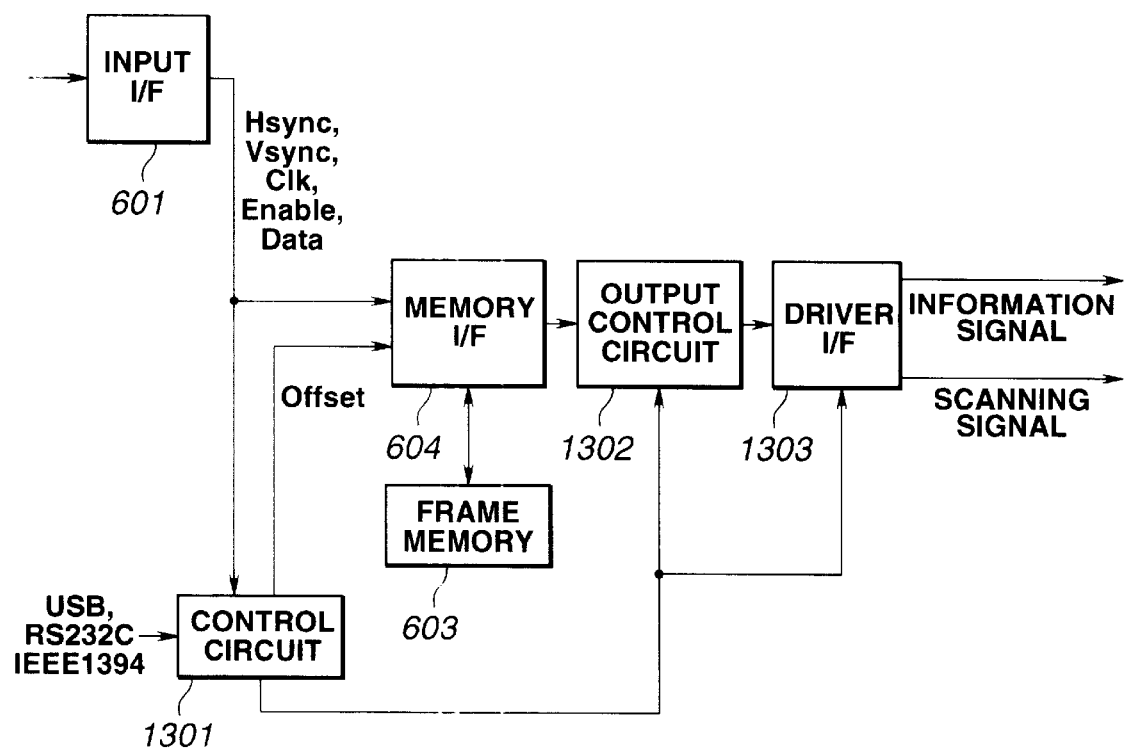
FIG. 13 is block diagram illustrating another configuration of the display controller within the high-resolution monitor shown in FIG. 1 according to a second embodiment of the present invention.

FIG. 13 is a diagram illustrating the configuration of the display controller 401B within the high-resolution monitor 216 according to a second embodiment of the present invention. In FIG. 13 (taken together with FIGS. 1 and 3B), components having the same functions as those shown in FIG. 6 are indicated by the same reference numerals.

The input I/F 601 receives image data and various kinds of synchronizing signals output from the graphic card 215, and outputs the received signals to the memory I/F 604 and a control circuit 1301.

The control circuit 1301 determines the storage position of the image data in the memory 603 from the image data and synchronizing signals and outputs a control signal to the memory I/F 604. The control circuit 1301 also determines a display mode, and outputs a control signal for image magnifying processing (to be described below) to an output control circuit 1302 and a driver I/F 1303.

The output control circuit 1302 has the function of reading image data for each line from the memory 603 in accordance with a scanning timing for the display panel 403 and outputting the read image data to the driver I/F 1303. In the second embodiment, the output control circuit 1302 also has the function of magnifying an image in the lateral direction. This is the function of magnifying image data read from the memory 603 by copying the data for each pixel. For example, when data is represented in the following manner:

R1G1B1 R2G2B2 R3G3B3 . . . (R: red data, G: green data, B: blue data, with each numeral representing the number of pixels counted from the left end of the picture surface) 2× magnification in the horizontal direction is performed by providing an output of:

R1G1B1R1G1B1   R2G2B2R2G2B2 R3G3B3R3G3B3 . . . . The output control circuit 1302 also has the function of performing on-off switching of this magnifying function in accordance with an instruction from the control circuit 1301.

The driver I/F 1303 generates an information signal and a scanning signal based on the image data from the output control circuit 1302, and outputs the generated signals to the driver IC's 402 and 404. In the second embodiment, the driver I/F 1303 can output a scanning signal for two continuous lines for one line of an inputted information signal in accordance with an instruction from the control circuit 1301. That is, the driver I/F 1303 can perform processing of magnifying an image in the vertical direction by repeating lines.

Figure 14:
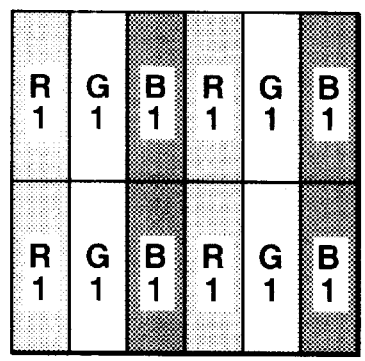
FIG. 14 is a diagram illustrating an operation of transmitting an image signal to the circuitry shown in FIG. 13.

By simultaneously using the magnifying functions of the output control circuit 1302 and the driver I/F 1303, it is possible to display one pixel of image data from the input I/F 601 as a block of 2×2 pixels obtained by magnifying the original pixel twice in both the vertical and horizontal directions, as shown in FIG. 14.

In the first embodiment shown in FIG. 6, a part of R data of the upper left pixel of each divided image data obtained by dividing the high-resolution image data into four equal portions is convereted into display-position information. In the second embodiment, the lower 2 bits of each of 8-bit R, G and B data from 4 consecutive pixels at the upper left of each divided image data (i.e., 24 bits in total) are converted into ID data indicating a display mode and a display position. The obtained ID data is then output to the high-resolution monitor 216.

Figure 15:
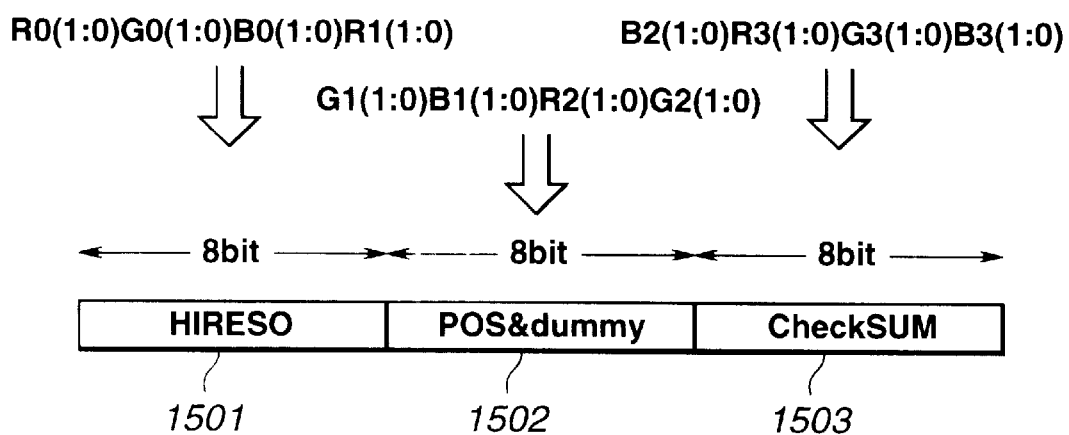
FIG. 15 is a diagram illustrating the configuration of data dealt with in the circuitry shown in FIG. 13.

FIG. 15 is a diagram illustrating the configuration of the 24-bit ID data. In this embodiment, 8-bit data "HIRESO" 1501 is used as a flag which, when set to a value of 5A, indicates high-resolution image data. Data "POS" indicates the position of a divided image in high-resolution image data. Data "dummy" is a fixed value which, in this embodiment, is set to a value of 88. The data POS and dummy comprise 8 bits in total. Data "CheckSUM" is the lower 8-bits of the sum of the respective 8-bit data HIRESO and POS & dummy.

In the display system of the second embodiment, the ID data is not inserted when displaying images originating from the operating system and a GUI (graphical user interface).

The control circuit 1301 of the display controller 401 determines if image data transferred based on the ID data is high-resolution image data.

Figure 16:
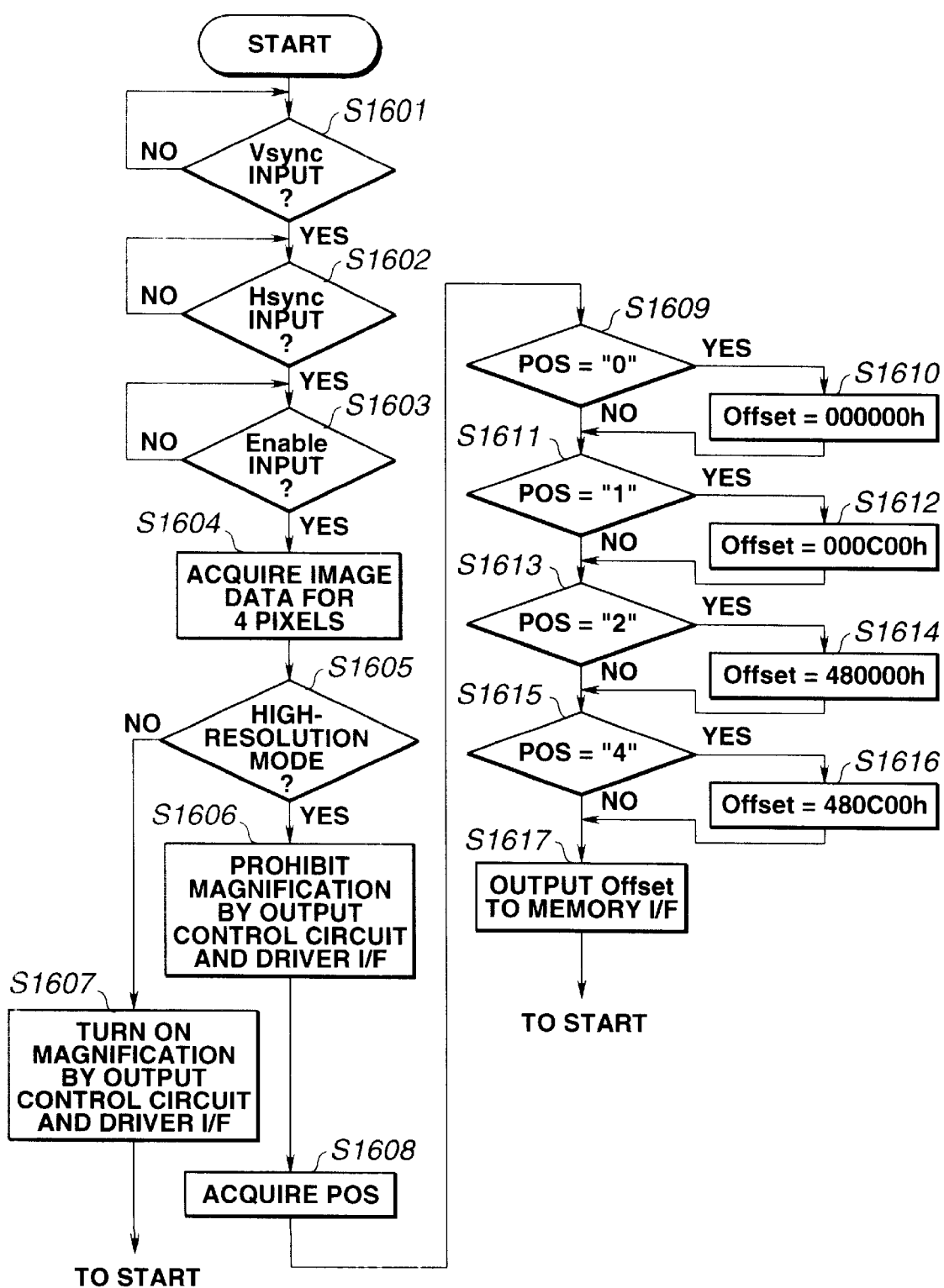
FIG. 16 is a flowchart illustrating the operation of the control circuit shown in FIG. 13.

The operation of the control circuit 1301 will now be described with reference to the flowchart shown in FIG. 16.

After respective synchronizing signals and image data have been input from the input I/F 601, and inputs of the vertical synchronizing signal, the horizontal synchronizing signal and the display enable signal have been confirmed (steps S1601, S1602 and S1603, respectively), image data for 4 pixels is stored in synchronization with a pixel clock signal. The control circuit 1301 extracts the lower 2 bits of each 8-bit R, G and B data, i.e., 24 bits in total, from the image data for 4 pixels (step S1604), and determines if the image data represents a high-resolution image (step S1605).

More specifically, the control circuit 1301 determines that the image data is high-resolution image data when the value of the first 8 bits is 5A and the last 8 bits is the value of the data CheckSUM. When this occurs, the control circuit 1301 prohibits magnifying processing by the output control circuit 1302 and the driver I/F 1303 (step S1606). On the other hand, if the result of the determination in step S1605 is negative, magnifying processing by the output control circuit 1302 and the driver I/F 1303 is executed (step S1607).

In the case of high-resolution image data, the display position of the divided image data is detected based on the POS bits extractred from among the 24 bits of the ID data, and the offset value of the write address of the image data in the memory 603 is determined as in the case of FIG. 12.

As described above, in the second embodiment, ID data is not inserted when displaying images originating from the operating system and standard-resolution images, such as display from a GUI. Hence, it is possible to automatically magnify a displayed image on the high-resolution monitor 216 and to display an image having a standard resolution on the entire picture surface of the high-resolution monitor 216.

Display of high-resolution image data in this embodiment is similar to FIG. 10 of the first embodiment, in which image data 1001 having a high resolution of 2,048×1,536 is converted into four equal-size image data 1002–1005, each having a resolution of 1,024×768. Thus, high-resolution image data is divided into image data having an ordinary resolution, which is capable of being processed by the graphic card 215. This ordinary resolution data is then transferred to the high-resolution monitor 216 for all four images in turn. The high-resolution monitor 216 synthesizes these divided image data and displays the obtained image as an image 1006 having a resolution of 2,048×1,536.

Accordingly, in the system of the second embodiment, it is possible to output high-resolution image data from a host computer to a high-resolution monitor using an existing standard resolution graphic card and graphic accelerator. An ordinary existing device driver for controlling the graphic card is also used.

Next, a third embodiment of the present invention will be described.

Figure 17:
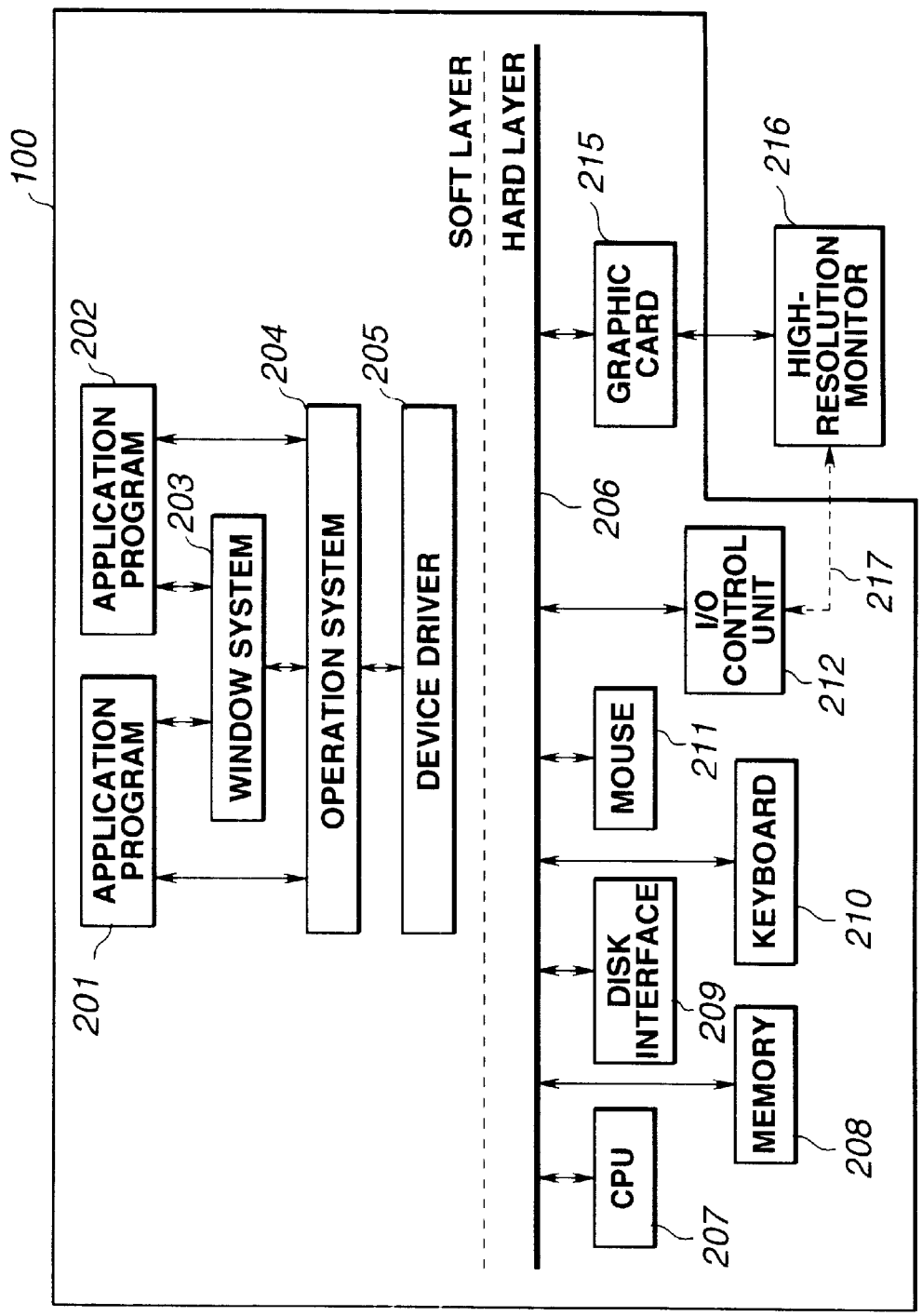
FIG. 17 is a block diagram illustrating the configuration of a display system according to a third embodiment of the present invention.

FIG. 17 is a diagram illustrating the configuration of a display system according to the third embodiment.

In FIG. 17, the same components as those shown in FIG. 1 are indicated by the same reference numerals, and further description thereof will be omitted. The configuration of FIG. 17 differs from the configuration of FIG. 1 in that a serial communication line 217 is connected from the I/O control unit 212 to the high-resolution monitor 216, so that the high resolution image data can be transmitted without passing through the graphic card 215.

In the third embodiment, as in the foregoing embodiments, the application program reads high-resolution image data from the disk interface 209, and writes the read image data in the memory 208. Then, the application program transfers information relating to a color serving as a "key" in serial communication (hereinafter termed a "key color"), the display position of the high-resolution image data within the memory 208, and resolution information to the display controller 401 of the high-resolution monitor 216. In one example of the third embodiment, the "key color" is defined as "R=13, G 13 and B=126", and the top-left corner of the high resolution image data is to be displayed at a position of 150 low resolution pixels from the left and 100 low resolution pixels from the top. The resolution of the high resolution section in this example is 900×1,200.

The application program outputs the high-resolution image data stored in the memory 208 to the display controller 401 of the high-resolution monitor 216 by serial communication via serial communication line 217. At the same time, a window in the low resolution image is painted with the "key color". This painted window determines the size and the position of the high-resolution image data which is to be displayed on the monitor.

Figure 18:
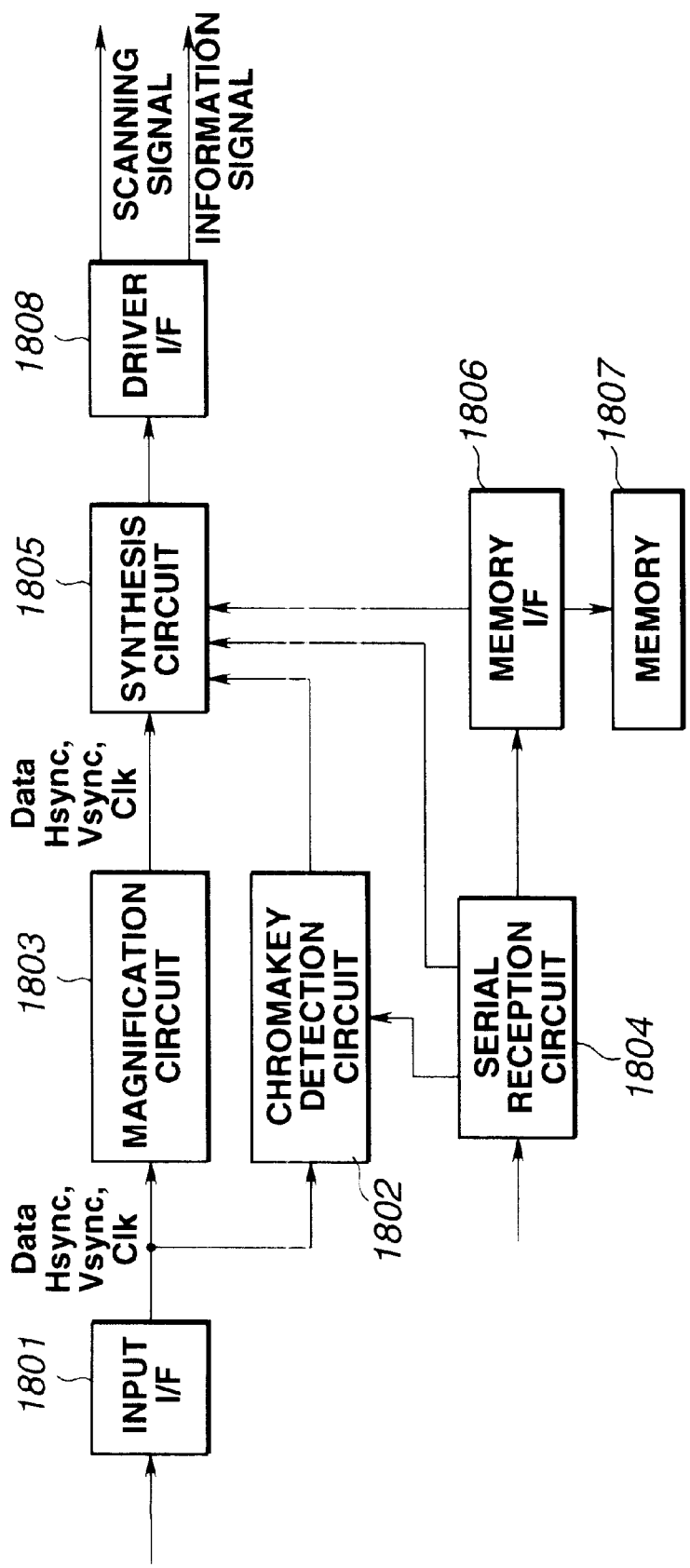
FIG. 18 is a block diagram illustrating the configuration of a display controller within a high-resolution monitor shown in FIG. 17.

FIG. 18 is a diagram illustrating the configuration of the display controller 401B within the high-resolution monitor 216.

An input I/F 1801 receives low resolution image data for each line and each synchronizing signal transferred from the graphic card 215, and outputs the received low resolution data to a chromakey detection circuit 1802 and a magnification circuit 1803. The magnification circuit 1803 magnifies image data two times in both the vertical and horizontal directions.

A serial reception circuit 1804 receives the high resolution image data transferred through the serial communication line, such as USB or the like, in the above-described manner, and outputs the received high resolution image data to a memory I/F 1806. The serial reception circuit 1804 also outputs "key-color information" transferred through the serial communication line to the chromakey detection circuit 1802, and outputs display-position information and image-resolution information to a synthesis circuit 1805.

The memory I/F 1806 writes and develops the image data received by serial communication in a memory 1807. The memory I/F 1806 also reads image data written within the memory 1807 for each line, and outputs the read image data to the synthesis circuit 1805.

The chromakey detection circuit 1802 receives the low resolution image data from the input I/F 1801, and determines if the same "key color" that was transmitted by serial communication is included within the image data. When the key color is detected in the low resolution image, the chromakey detection circuit 1802 outputs an HRON signal to the synthesis circuit 1805.

Figure 19:
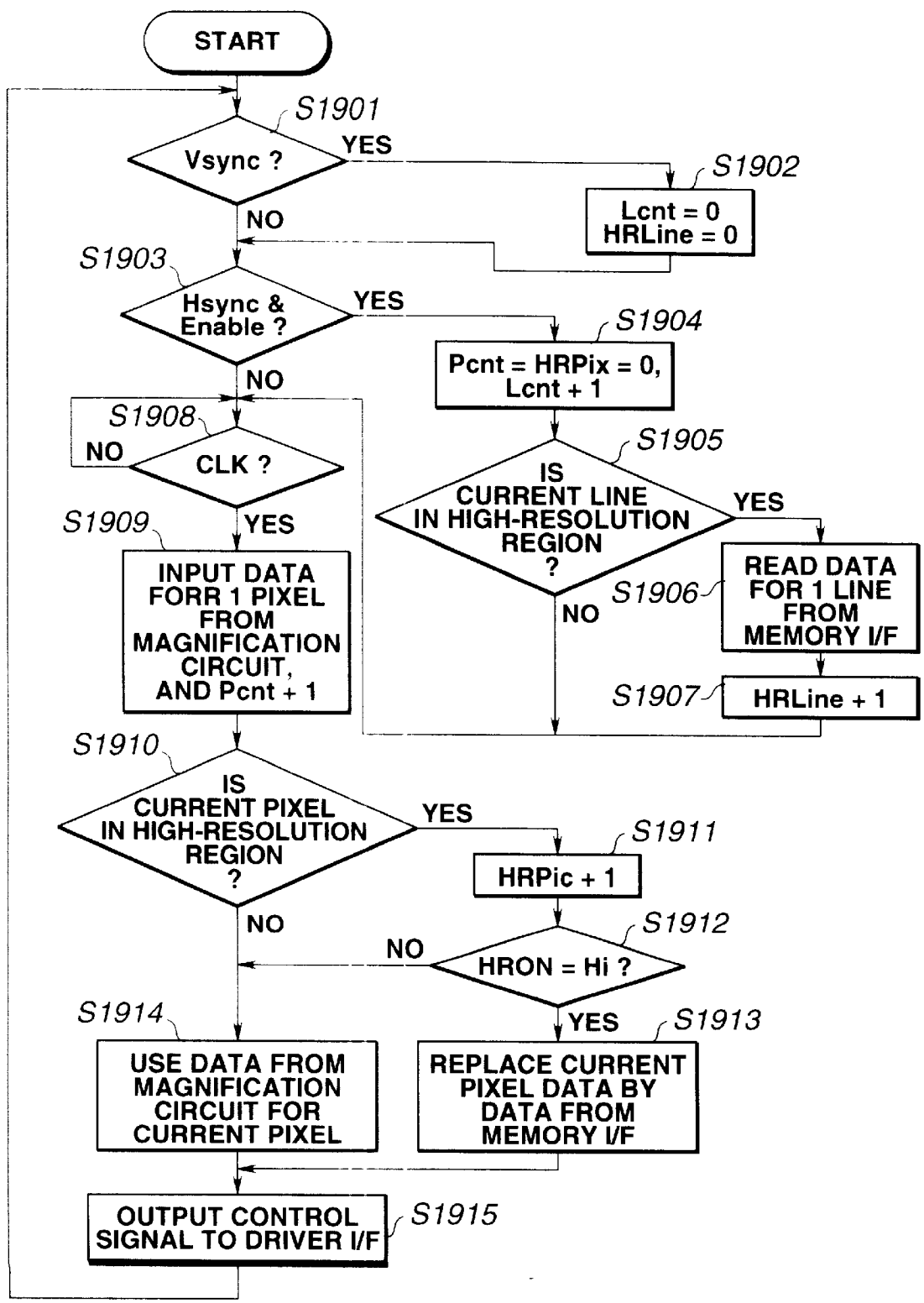
FIG. 19 is a flowchart illustrating the operation of a synthesis circuit shown in FIG. 18.

FIG. 19 is a flowchart illustrating the operation of the synthesis circuit 1805.

In FIG. 19, symbols Pcnt and Lcnt represent the values of counters for counting the numbers of low resolution pixels and lines to be processed by the synthesis circuit 1805, respectively, and symbols HRPix and HRLine represent the values of counters for counting the numbers of high resolution pixels and lines in the high resolution data read from the memory I/F 1806, respectively.

After detecting a vertical sync signal from the input I/F 1801 (step S1901), the synthesis circuit 1805 resets the two line counters (step S1902). Then, after detecting both a horizontal sync signal and a display enable signal (step S1903), the synthesis circuit 1805 resets the two pixel counters and increments the line-counter value Lcnt by one (step S1904). At that time, if the low resolution line being processed intersects with the desired position of the high resolution image received by serial communication (which, in this example, would be greater than or equal to 100 and less than 700), the memory I/F 1806 reads data for one line corresponding to the value HRLine (step S1906), and the value HRLine is incremented by one (step S1907).

Then, the pixel corresponding to the value Pcnt is read from the magnification circuit 1803 in synchronization with a clock signal, and the value Pcnt is incremented by one (steps S1908 and S1909). If the pixel currently being processed is within the high resolution display position (which, in this example, would be greater than or equal to 150 and less than 600) (step S1910), the value HRPix is incremented by one (1911). Then, if the HRON signal assumes Hi (step S1912), data of the pixel corresponding to the value HRPix in the image data of the line read by the memory I/F 1806 is used as the output data (step S1913).

If, on the other hand, the image data read from the magnification circuit 1803 is not in the high-resolution region, the image data read from the magnification circuit 1803 is output to the driver I/F without being modified (steps S1914 and S1915).

As described above, in the third embodiment, images transferred from the graphic card are magnified by the magnification circuit twice (in both the vertical and horizontal directions), and displayed in all regions of the display except for the region painted by the "key color". The high resolution image transferred by the serial communication line 217 s displayed in the area painted by the "key color".

Figure 20:
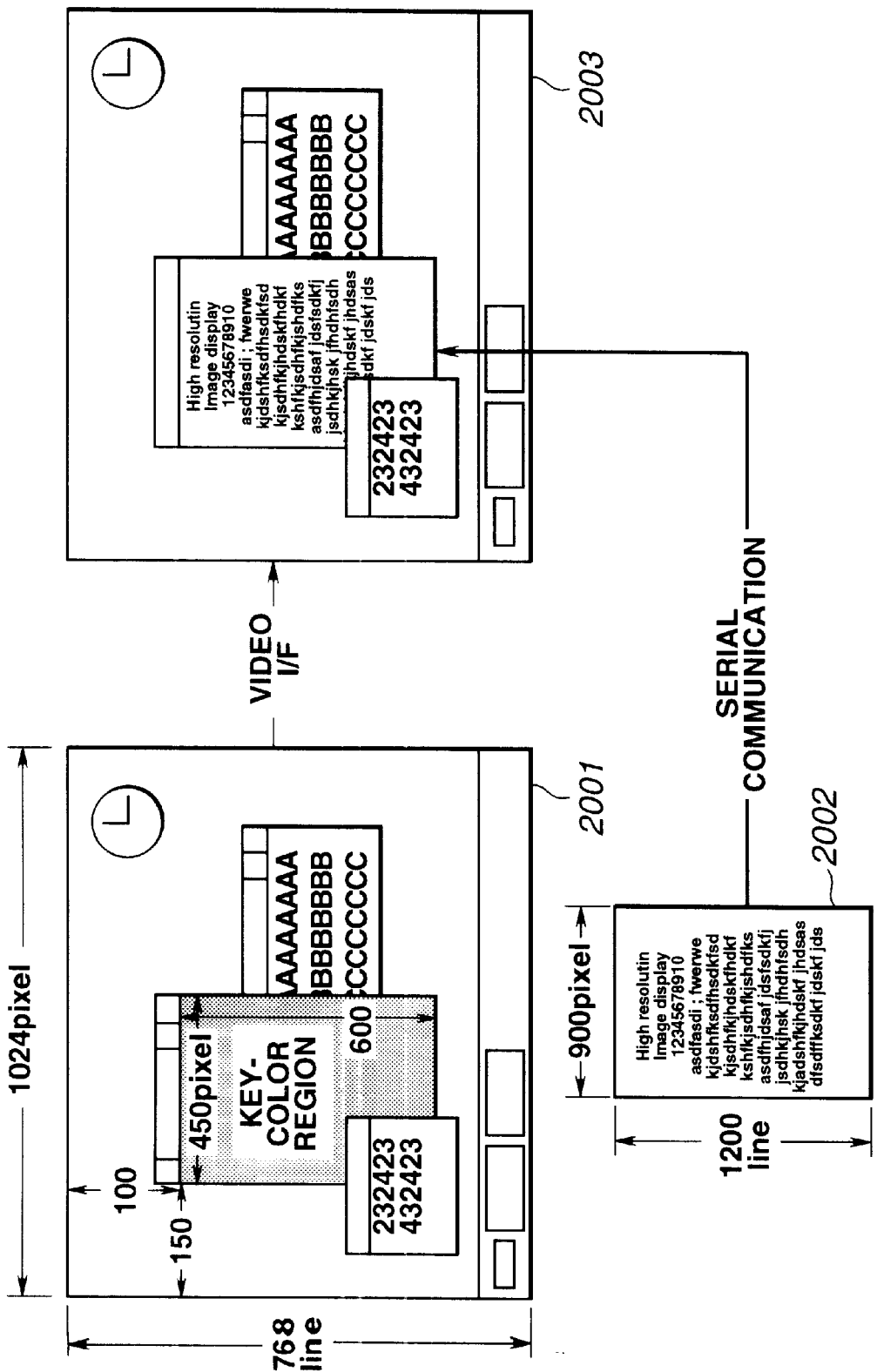
FIG. 20 is a diagram illustrating images displayed in the system shown in FIG. 17.

Thus, the high-resolution image transmitted by serial communication is displayed in the "key color" area. FIG. 20 is a diagram illustrating a manner of display on the high-resolution monitor of the third embodiment. In FIG. 20, reference numeral 2001 represents a standard-resolution image output from the graphic card 215, reference numeral 2002 represents a high-resolution image transferred through the serial communication line 217, and reference numeral 2003 represents a state of display of these images on the high-resolution monitor 216.

As described above, in the third embodiment, a standard-resolution image signal is transmitted using an existent video I/F, and a high-resolution image signal is transmitted using a serial communication line. The high-resolution image transmitted by serial communication and the standard-resolution image are synthesized in accordance with an area in the standard-resolution image having a specific color (i.e., the key color).

Accordingly, it is possible to synthesize a low-resolution image and a high-resolution image from a host computer and display them both on a high-resolution monitor using only an existing standard resolution graphic card and graphic accelerator and an existing device driver.

Although in the foregoing embodiments, a description has been provided illustrating a high resolution image having four times as many pixels per unit area than the standard-resolution image, the present invention is not limited to such a case. For example, the present invention may also be applied to a system in which an image signal having a first resolution is transmitted to a display panel capable of displaying an image having the first resolution, using a graphic card capable of transmitting an image signal having a resolution lower than the first resolution. The same effects as in the foregoing embodiments are also obtained in this case.

As described above, according to the foregoing embodiments, even in a display system which supports only a lower resolution than the resolution of a high-resolution display panel, it is possible to output high-resolution image data from a transmission apparatus to a high-resolution monitor and display a high-resolution image.

The individual components designated by blocks in the drawings are all well-known in the display system arts and their specific construction and operation are not critical to the operation or the best mode for carrying out the invention.

While the present invention has been described with respect to what are presently considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A display system comprising:
   a display apparatus having
      receiving means for receiving second image data having a second resolution,
      resolution conversion means for converting the second image data having the second resolution to first image data having a first resolution,
      a memory capable of storing the first image data having the first resolution, and
      a display panel capable of displaying an image corresponding to the first image data at the first resolution,
   said display system further comprising:
   a transmission apparatus for transmitting the first image data representing the image having the first resolution and second image data representing the image having the second resolution lower than the first resolution to said display apparatus,
   wherein said system has a first mode in which said transmission apparatus divides the first image data into a plurality of sub-areas so that a resolution in one sub-area is lower than a predetermined resolution and transmits image data for each of the sub-areas to said display apparatus in sequence, and said display apparatus regenerates the first image data by combining the image data for each of the sub-areas transmitted from said transmission apparatus, using said memory, and displays the image having the first resolution represented by the regenerated first image data, and a second mode in which said transmission apparatus transmits the second image data, and said display apparatus converts the resolution of the second image data transmitted from said transmission apparatus into first resolution data using said resolution conversion means and displays the image having the first resolution using the display panel, based on the first resolution data.

2. A system according to claim 1, wherein said transmission apparatus transmits control data indicating a display position of each of the plurality of sub-areas together with the image data for each of the plurality of sub-areas, and wherein said display apparatus synthesizes the first image data in accordance with the control signal.

3. A system according to claim 2, wherein said display apparatus further comprises control means for writing the synthesized first image data in accordance with the control data.

4. A system according to claim 3, wherein said control means also controls resolution conversion processing by said resolution conversion means in accordance with the control data.

5. A system according to claim 2, wherein said transmission apparatus converts a part of the first image data into the control data and transmits the resulting control data.

6. A system according to claim 1, wherein said transmission apparatus includes a computer for transmitting the first and second image data in accordance with a program.

7. A system according to claim 6, wherein said computer transmits the first and second image data in accordance with driver software capable of processing the image data having the second resolution.

8. A system according to claim 1, wherein said transmission apparatus transmits the first image data and the second image data through different transmission channels.

9. A system according to claim 8, wherein said display apparatus further comprises combining means for combining the first image data transmitted through a first transmission channel, and the second image data transmitted through a second transmission channel and subjected to the resolution conversion processing.

10. A system according to claim 9, wherein said combining means detects image data representing a specific image in the second image data transmitted through the second transmission channel, and combines the first image data and the second image data in accordance with a result of the detection.

11. A system according to claim 1, wherein said transmission apparatus transmits the first image data and the second image data through a common transmission channel.

12. A system according to claim 1, wherein said system further has a third mode in which said transmission apparatus converts the resolution of the second image data into the first resolution, divides the second image data whose resolution has been converted into a plurality of sub-areas so that a resolution in one sub-area is lower than the predetermined resolution, and transmits image data for the sub-areas to said display apparatus, and said display apparatus combines the image data for the sub-areas using said memory and displays the image having the first resolution.

13. A system according to claim 12, wherein the predetermined resolution is the first resolution.

14. A system according to claim 1, wherein each of said sub-areas is rectangular.

15. A system according to claim 1, wherein all of said sub-areas have the same size.

16. An apparatus for transmitting image data to a display apparatus capable of displaying an image having a first resolution, comprising:
   division means for dividing image data representing a first image having the first resolution into a plurality of sub-areas, each of said sub-areas having a second resolution lower than the first resolution; and transmission means for transmitting the image data for each of the plurality of sub-areas generated by said division means to said display apparatus in sequence, wherein said display apparatus regenerates the first image having the first resolution by combining the image data for each of the plurality of sub-areas transmitted from said transmission means.

17. An apparatus according to claim 16, wherein said transmission means also transmits second image data having the second resolution to said display apparatus.

18. An apparatus according to claim 17, wherein said display apparatus converts the resolution of the second image data transmitted by said transmission means into the first resolution, and displays an image having the first resolution represented by the second image data whose resolution has been converted.

19. An apparatus according to claim 17, further comprising:

resolution conversion means for converting the resolution of the second image data into the first resolution.

20. An apparatus according to claim 19, wherein said division means also divides the second image data whose resolution has been converted by said resolution conversion means into the plurality of sub-areas.

21. An apparatus according to claim 17, wherein said transmission means transmits the first image data and the second image data through different transmission channels.

22. An apparatus according to claim 21, wherein said display apparatus combines the first image data transmitted through a first transmission channel and the second image data transmitted through a second transmission channel.

23. An apparatus according to claim 17, wherein said transmission means transmits the first image data and the second image data through a common transmission channel.

24. An apparatus according to claim 16, wherein said transmission means transmits control data indicating a display position of each of the plurality of sub-areas together with each of the plurality of sub-areas, and wherein said display apparatus synthesizes image data representing the plurality of sub-areas in accordance with the control data.

25. An apparatus according to claim 24, wherein said transmission means converts a part of the first image data into the control data and transmits the resulting control data.

26. An apparatus according to claim 16, wherein each of said sub-areas is rectangular.

27. An apparatus according to claim 16, wherein all of said sub-areas have the same size.

28. A display apparatus for displaying an image represented by an image at a first resolution, wherein said display apparatus inputs second resolution image data for each of a plurality of sub-areas generated by dividing first resolution image data into the plurality of sub-areas, in sequence, said second resolution being lower than the first resolution, and regenerates the first resolution image data by combining the second resolution image data for the plurality of sub-areas, and displays an image represented by the regenerated first resolution image data.

29. An apparatus according to claim 28, wherein a second image data having a second resolution lower than the first resolution is also input, wherein the resolution of the second image data is converted into the first resolution, and wherein an image represented by the second image data whose resolution has been converted is displayed with the first resolution.

30. An apparatus according to claim 28, wherein control data indicating a display position of each sub-area is also input, and wherein image signals representing the respective sub-areas are combined in accordance with the control data.

31. A transmission apparatus for transmitting an image signal to a display apparatus capable of displaying an image having a first resolution, wherein said transmission apparatus divides first image data having the first resolution into a plurality of sub-areas so that a resolution in one sub-area is lower than a predetermined resolution, and transmits the first image data divided into the plurality of sub-areas to the display apparatus in sub-area units, and wherein said display apparatus regenerates the first image data having the first resolution by combining the first image data transmitted to the display apparatus after being divided into sub-areas.

32. An apparatus according to claim 31, wherein second image data having a second resolution lower than the first resolution is also transmitted to the display apparatus, and wherein the display apparatus converts the resolution of the transmitted second image data into the first resolution, and displays an image represented by the second image data whose resolution has been converted, with the first resolution.

33. An apparatus according to claim 31, wherein said transmission apparatus includes a computer for transmitting the first image data in accordance with a program.

34. An apparatus according to claim 33, wherein said computer transmits the first image data in accordance with driver software capable of processing image data having the predetermined resolution.

35. A display apparatus comprising:

input means for inputting a first image signal representing a first image of a first resolution, additional information including display position information indicating a display position of the first image and a second image signal representing a second image of a second resolution different from the first resolution, the first image signal, the additional information and the second image signal being transmitted from a transmission apparatus;

resolution changing means for changing the resolution of the second image signal of the second resolution into the first resolution;

multiplexing means for multiplexing the second image signal which resolution is changed by said resolution changing means and the first image signal according to the display position information; and displaying means for displaying an image represented by the image signal output from said multiplexing means.

36. An apparatus according to claim 35, wherein said input means receives the first image signal and the additional information through a first transmission path, and wherein said input means receives the second image signal through a second transmission path different from the first transmission path.

37. An apparatus according to claim 35, wherein said multiplexing means includes a memory for storing the first image signal and reading means for reading the first image signal from said memory, and wherein said multiplexing means multiplexes the second image signal which resolution is changed by said resolution changing means and the first image signal read out from said memory.

38. An apparatus according to claim 37, wherein said multiplexing means controls a reading timing of the first image signal by said reading means according to the display position information.

39. An apparatus according to claim 35, wherein said second image signal has a key-color area into which the first image signal is to be multiplexed.

40. An apparatus according to claim 39, wherein said multiplexing means includes detecting means for detecting the key-color area of the second image signal, and wherein said multiplexing means multiplexes the second image signal whose resolution is changed by said resolution changing means and the first image signal according to a detection result of the detecting means and the display position information.

41. An apparatus according to claim 40, wherein the additional information includes key-color information representing the key-color.

42. An image processing apparatus comprising:

input means for inputting a first image signal representing a first image of a first resolution, additional information including display position information indicating a display position of the first image and a second image signal representing a second image of a second resolution different from the first resolution, the first image signal, the additional information and the second image signal being transmitted from a transmission apparatus;

resolution changing means for changing the resolution of the second image signal of the second resolution into the first resolution;

multiplexing means for multiplexing the second image signal which resolution is changed by said resolution changing means and the first image signal according to the display position information; and output means for outputting the image signal output from said multiplexing means to a display device.

43. An apparatus according to claim 42, wherein said input means receives the first image signal and the additional information through a first transmission path, and wherein said input means receives the second image signal through a second transmission path different from the first transmission path.

44. An apparatus according to claim 42, wherein said multiplexing means includes a memory for storing the first image signal and reading means for reading the first image signal from said memory, and wherein said multiplexing means multiplexes the second image signal which resolution is changed by said resolution changing means and the first image signal read out from said memory.

45. An apparatus according to claim 44, wherein said multiplexing means controls a reading timing of the first image signal by said reading means according to the display position information.

46. An apparatus according to claim 42, wherein said second image signal has a key-color area into which the first image signal is to be multiplexed.

47. An apparatus according to claim 46, wherein said multiplexing means includes detecting means for detecting the key-color area of the second image signal, and wherein said multiplexing means multiplexes the second image signal which resolution is changed by said resolution changing means and the first image signal according to a detection result of the detecting means and the display position information.

48. An apparatus according to claim 47, wherein the additional information includes key-color information representing the key color.

49. A display apparatus comprising:

input means for inputting a first image signal representing a first image of a first resolution, additional information including display position information indicating a display position of the first image and a second image signal representing a second image of a second resolution different from the first resolution, the second image signal having a key-color area into which the first image signal is to be multiplexed;

resolution changing means for changing the resolution of the second image signal of the second resolution into the first resolution;

multiplexing means for detecting the key-color area of the second image signal input by said input means and for multiplexing the second image signal which resolution is changed by said resolution changing means and the first image signal according to the detection result and the display position information; and displaying means for displaying an image represented by the image signal output from said multiplexing means.

50. An image processing apparatus for multiplexing a first image signal representing a first image of a first resolution and a second image signal representing a second image of a second resolution different from the first resolution using a chromakey process, said apparatus comprising:

input means for inputting a first image signal representing a first image of a first resolution and a second image signal representing a second image of a second resolution different from the first resolution;

key-color detecting means for detecting a key color in the second image signal input by said input means;

indication signal generating means for generating an indication signal indicating an area in which the first image is to be displayed;

resolution changing means for changing the resolution of the second image signal input by said input means into the first resolution; and multiplexing means for multiplexing the second image signal which resolution is changed by said resolution changing means and the first image signal according to the detection result of the key color detecting means and the indication signal.

* * * * *

UNITED STATES PATENT AND TRADEMARK OFFICE
CERTIFICATE OF CORRECTION

PATENT NO. : 6,266,042 B1
DATED : July 24, 2001
INVENTOR(S) : Shuntaro Aratani

It is certified that error appears in the above-identified patent and that said Letters Patent is hereby corrected as shown below:

Column 3,
Line 4, "of" should read -- of the --.

Column 4,
Line 48, "of he" should read -- of the --; and
Line 50, "receive" should read -- receives --.

Column 9,
Line 59, "convereted" should read -- converted --.

Column 11,
Line 22, "G 13" should read -- G=13 --.

Column 12,
Line 30, "(1911)" should read -- (step S1911) --; and
Line 45, "s" should read -- is --.

Signed and Sealed this

Fifth Day of March, 2002

Attest:

JAMES E. ROGAN
Attesting Officer    Director of the United States Patent and Trademark Office